United States Patent [19]

Chasser et al.

[11] Patent Number: 5,256,738
[45] Date of Patent: Oct. 26, 1993

[54] FUNCTIONAL RUBBER-BASED STRUCTURAL ADHESIVE COMPOSITIONS

[75] Inventors: Anthony M. Chasser, Glenshaw; John R. Schneider, Allison Park, both of Pa.

[73] Assignee: PPG Industries, Inc., Pittsburgh, Pa.

[21] Appl. No.: 807,737

[22] Filed: Dec. 16, 1991

Related U.S. Application Data

[63] Continuation of Ser. No. 474,604, Feb. 5, 1990, abandoned.

[51] Int. Cl.$^5$ .............................................. C08C 19/20
[52] U.S. Cl. ................................ 525/330.9; 525/332.6; 525/332.7; 525/349
[58] Field of Search ............... 525/328.3, 329.3, 330.8, 525/330.9, 331.9, 332.6, 332.7, 332.8

[56] References Cited

U.S. PATENT DOCUMENTS 2,058,246 10/1936 McCortney.
2,220,640 11/1940 Scholl et al.

(List continued on next page.)

FOREIGN PATENT DOCUMENTS

| 2000569 | 10/1989 | Canada. |
| 097394 | 6/1983 | European Pat. Off.. |
| 0287190 | 10/1988 | European Pat. Off.. |
| 318878 | 11/1988 | European Pat. Off.. |
| 931722 | 8/1955 | Fed. Rep. of Germany. |
| 3741165 | 6/1989 | Fed. Rep. of Germany. |
| 3834818 | 11/1989 | Fed. Rep. of Germany. |
| 49-24237 | 3/1974 | Japan. |
| 51-91959 | 8/1976 | Japan. |
| 56-90868 | 7/1981 | Japan. |

OTHER PUBLICATIONS

Bulletin of Aichi Prefecture Industry Inst., vol. 11, pp. 46-51 (1975) (English translation).

English translation of a technical bulletin of Nippon Zeon describing liquid polymers known as POLYOIL, date unknown.

C. S. L. Baker et al, Elastomerics, Jul. 1989, "Advances in Natural Rubber for Tires: Compounding for Improved Wear".

Selected pages from Adhesion and Adhesives edited by De Bruyne-Houwink; Elsevier Publishing Company, 1951.

Article from Fibres, Films, Plastics and Rubbers, A Handbook of Common Polymers published by Butterworths, 1971, pp. 353 to 362.

R. G. Stacer et al, Article from Rubber Chemistry & Technology, "Criteria for Unstable Tearing of Elastomers".

Primary Examiner—Christopher Henderson
Attorney, Agent, or Firm—William J. Uhl

[57] ABSTRACT

A one-package stable rubber based curable composition contains:

(a) a functional rubber polymer selected from the group consisting of functional homopolymers of polybutadiene, isoprene or neoprene; functional copolymers of polybutadiene, isoprene and/or neoprene; and functional copolymers of polybutadiene, neoprene or isoprene with an aliphatic or alicyclic unsaturated hydrocarbon; and (b) a vulcanization system comprising sulfur, wherein the composition contains at least 15 parts of functional rubber polymer per 100 parts of composition and at least 15 parts of sulfur per 100 parts of the total amount of all rubber polymers in the composition, with the proviso that the cured composition has an elongation not exceeding 15 percent and the functional groups present on the functional rubber polymer of (a) remain essentially unreacted during cure of the composition.

15 Claims, No Drawings

U.S. PATENT DOCUMENTS

| | | |
|---|---|---|
| 2,251,220 | 7/1941 | Campbell . |
| 2,297,871 | 10/1942 | Campbell . |
| 2,311,004 | 2/1943 | Thomas et al. . |
| 2,311,656 | 2/1943 | Griffith . |
| 2,329,852 | 9/1943 | Reid . |
| 3,108,035 | 10/1963 | Rappaport et al. . |
| 3,260,641 | 7/1966 | Falcone . |
| 3,274,142 | 9/1966 | Warren . |
| 3,578,624 | 5/1971 | Fuller . |
| 3,580,894 | 5/1971 | Lenke . |
| 3,756,969 | 9/1973 | Danielson . |
| 3,903,026 | 9/1975 | Fujimura et al. . |
| 3,919,133 | 11/1975 | Dawans et al. . |
| 3,976,624 | 8/1976 | Inouye et al. . |
| 4,077,948 | 3/1978 | Cowell et al. . |
| 4,281,085 | 7/1981 | Ikeda et al. . |
| 4,371,668 | 2/1983 | Ikeda et al. . |
| 4,461,875 | 7/1984 | Crepeau . |
| 4,485,833 | 12/1984 | Uraneck et al. . |
| 4,496,683 | 1/1985 | Morita . |
| 4,537,938 | 8/1985 | Uraneck et al. . |
| 4,600,745 | 7/1986 | Creighton ............ 524/534 |
| 4,614,771 | 9/1986 | Watanabe et al. . |
| 4,616,069 | 10/1986 | Watanabe et al. . |
| 4,647,625 | 3/1987 | Aonuma et al. . |
| 4,677,165 | 6/1987 | Kikuchi et al. . |
| 4,740,559 | 4/1988 | Johansson et al. . |
| 4,752,507 | 6/1988 | Johansson et al. . |
| 4,824,908 | 4/1989 | Tsutsumi et al. . |
| 4,835,221 | 5/1989 | Bronstert et al. . |
| 5,149,742 | 9/1992 | Hemel ............ 525/124 |

FUNCTIONAL RUBBER-BASED STRUCTURAL ADHESIVE COMPOSITIONS

This application is a continuation of application Ser. No. 07/474,604, filed Feb. 5, 1990 now abandoned.

BACKGROUND OF THE INVENTION

The present invention relates to rubber based curable compositions.

Spot welding has been used in the past for structural support in doors, decklids and hoods of automobiles; however, these weld points are also sources of corrosion as well as cosmetic blemishes when done on exterior panels. Moreover, two-sided galvanized metals which are more frequently utilized do not readily lend themselves to spot welding. Automobile manufacturers have, therefore, moved away from spot welding by using it in conjunction with structural adhesives and in limited applications using the adhesives exclusively.

High strength structural adhesives are almost exclusively epoxy based compositions and although they have good structural integrity, they also have certain disadvantages, including spotty adhesion, variable corrosion resistance, lengthy cure times, poor oily metal grab, high cost and toxicity problems.

Induction heating of epoxy compositions was introduced and products were prepared to decrease cure times under these conditions. Induction curable products are generally lesser in ultimate performance properties to the slower curing epoxy counterparts, but are preferred when rapid curing is a priority. In spite of the flaws, e.g., lower strength, spotty adhesion and stability problems, these materials are becoming more and more important.

Rubber vulcanizable compositions are well known in the art and have been typified by excellent strength and elongation. While these formulations offer good cure properties and weathering resistance, their utility has been limited by indifferent adhesion to a variety of oily metals. When adhesion problems have been overcome, usually it has been by the addition of separate adhesion promoters such as organosilanes, phenolics, rosin acid or separate surface pretreatments, and still indiscriminate adhesion to a variety of metals and non-metallic substrates, oiled or unoiled, has in many cases not been accomplished.

Achieving adhesion of such rubber vulcanizable compositions to metals has been difficult and rarely is adhesion claimed to such diverse substrates as aluminum, cold rolled steel, sheet molding compound, zinc-coated metals and alloys thereof. Rubber vulcanizable compositions with high sulfur loadings capable of further enhancing the strength and hardness of the rubber also suffer from the same above problems and adhesion is either absent or very selective.

Functionalized rubbers, polymeric rubbers which have pendant groups such as hydroxyl, thiol, amine, carboxyl or epoxy, among others, have not been used to enhance adhesion but rather have been used 1) to impart to automobile tires a type of functional hysteresis effect wherein road grab is improved yet rolling resistance is not sacrificed, or 2) to participate in a separate distinct curing or crosslinking reaction.

In the instant invention, functionalized rubbers are used to prepare one component non-epoxy adhesives with high strength and adhesion to a wide spectrum of substrates and not for the inherent chemical reactivity of the functional group.

SUMMARY OF THE INVENTION

In accordance with the present invention, there is provided a one package stable rubber based curable composition, comprising:
 (a) a functional rubber polymer selected from the group consisting of functional homopolymers of polybutadiene, isoprene or neoprene; functional copolymers of polybutadiene, isoprene and/or neoprene; and functional copolymers of polybutadiene, neoprene or isoprene with an aliphatic or alicyclic unsaturated hydrocarbon; and
 (b) a vulcanization system comprising sulfur, wherein the composition contains at least 15 parts of functional rubber polymer per 100 parts of composition and at least 15 parts of sulfur per 100 parts of the total amount of all rubber polymers in the composition, with the proviso that the cured composition has an elongation not exceeding 15 percent and the functional groups present on the functional rubber polymer of (a) remain essentially unreacted during cure of the composition.

Also provided in accordance with the present invention are methods of adhesively bonding together two substrates to form a structurally reinforced composite.

DETAILED DESCRIPTION OF THE INVENTION

A principle component of the claimed stable, one package rubber based curable composition is a functional rubber polymer selected from the group consisting of functional homopolymers of polybutadiene, isoprene or neoprene; functional copolymers of polybutadiene, isoprene and/or neoprene; and functional copolymers of polybutadiene, isoprene or neoprene with an aliphatic or alicyclic unsaturated hydrocarbon.

The polybutadiene portion can be of 1,3-butadiene, 1,4-butadiene or 2,3-dimethyl-1,3-butadiene. Neoprene is polychloroprene. Isoprene is 3-methyl-1,3-butadiene or 2-methyl-1,3-butadiene. For the purposes of this application, by "functional rubber polymer" is meant a rubber polymer from the list above containing hydroxyl, thiol, amine, amide, carboxyl, epoxy, isocyanate, anhydride or acetoacetoxy groups. These groups can be pendant or terminal, but preferably are terminal.

It should be understood that the functional groups of the functional rubber polymer remain essentially unreacted during cure of the composition.

If desired, a variety of vulcanizable or non-vulcanizable nonfunctional synthetic rubbers can be used as extenders in conjunction with the functional rubber polymer detailed above. Examples of such synthetic rubbers include butyl rubber, ethylene propylene terpolymer, silicone rubbers, polysulfides and chlorinated polyethylene rubbers. Copolymers of many of the aforelisted synthetic rubbers with styrene can also be utilized.

Examples of suitable aliphatic or alicyclic hydrocarbons include terpene, pinene, cumene, indene and dicyclopentadiene.

The curable composition contains at least 15 parts of functional rubber polymer per 100 parts of composition, preferably at least 20 parts. If lesser amounts of functional rubber polymer are utilized, indiscriminate adhesion to a wide variety of substrates is sacrificed.

The functional rubber polymer generally has a number average molecular weight not exceeding 15,000, preferably not exceeding 8000. Typically the number average molecular weight of the functional rubber polymer ranges from about 1500 to about 5000. The molecular weight is determined using gel permeation chromatography (GPC) using a polystyrene standard.

The other principle constituent of the claimed curable composition is a sulfur containing vulcanization system.

As used in the specification, vulcanization is the physicochemical change resulting from crosslinking of the double bonds of the functional polymer with sulfur, generally with application of heat. Generally the sulfur is utilized with an activator and an accelerator and ideally a combination of primary and secondary accelerators is utilized.

As used in the instant specification, an activator is a material utilized to increase the vulcanization rate by complexing the accelerator and allowing it to perform more effectively.

The classification of an accelerator is based on the effect it has on the speed of the vulcanization reaction. Primary accelerators are catalysts used either exclusively or in the largest proportions and produce satisfactory cures within specified times. Secondary accelerators (typically utilized at levels of 10 to 20 percent of the total catalyst) are used to activate the primary accelerator and to improve final physical properties.

Examples of suitable activators include heavy metal oxides such as magnesium oxide, magnesium hydroxide, iron oxide and calcium oxide. Examples of primary accelerators include 2-mercaptobenzothiazole; 4-morpholinyl-2-benzothiazole; copper dimethyldithiocarbamate; lead diamyldithiocarbamate; lead dimethyldithiocarbamate; tellurium diethyldithiocarbamate, zinc diethyl dithiocarbamate, tetramethylthiuram monosulfide and 4,4' dithiomorpholine. Suitable secondary accelerators are exemplified by benzothiazyl disulfide, N-oxydiethylene 2-benzotriazole sulfenamide; N-cyclohexyl-2-benzothiazolesulfenamide, dipentamethylene thiuram tetrasulfide; tetraethylthiuram disulfide; 1,3-dibutyl thiourea and N,N'-diorthotolylguanidene.

For use in induction curable compositions, the zinc lower alkyl dithiocarbamate accelerators are preferred. These materials are commercially available in association with zinc in salt form, namely zinc dibutyl dithiocarbamate, zinc diethyl dithiocarbamate, zinc dimethyl dithiocarbamate and zinc diamyl dithiocarbamate. These materials can be commerically obtained from Vanderbilt Chemical Company under the tradename ZIMATE.

If desired, in the absence of primary accelerator, higher levels of secondary accelerators can be used with little or no los in performance.

The amount of sulfur which is part of the vulcanization system is at least 15 parts per 100 parts of the total amount of all rubber polymers in the composition. By this is meant that the 100 parts is based on the total amount of all rubber polymers present which includes not only the functional rubber polymer discussed above but also any vulcanizable or nonvulcanizable nonfunctional synthetic rubbers used as extenders in the composition. Preferably at least 20 parts of sulfur per 100 parts of total rubber are utilized. The sulfur can be utilized in a variety of forms but typically it is elemental sulfur and it is used as a solid oil-treated powder. For example, suitable sources of sulfur are the CRYSTEX brand sulfurs which are commercially available from Stauffer Chemical Company.

It should be understood that the accelerator materials discussed above can contribute a minor amount of the required sulfur in the vulcanization system.

The claimed curable compositions can comprise a variety of other optional additives in addition to the principle constituents which have been detailed above. Examples of additives include fillers such as calcium carbonate, stearic acid treated calcium carbonate, polybutadiene treated calcium carbonate, barium sulfate, calcium and magnesium oxide, carbon blacks, hydrocarbon tackifiers and various phthalate and adipate plasticizers and antioxidants. Examples of suitable antioxidants are butylated hydroxytoluene, butylated and styrenated phenols and cresols, alkylated quinones and hydroquinones and butylated hydroxy benzyl isocyanates.

A feature of the claimed curable composition is that the elongation of the cured composition does not exceed 15 percent. Compositions having higher elongations are generally weaker and lack the structural rigidity required for applications where epoxy based compositions are conventionally used. The elongation is determined with an INSTRON Tester according to ASTM D 638-72. The test is conducted at a speed of 5 inches per minute utilizing a sample measuring 1.5 inches×0.-25inch×0.008inch. The sample is taken from a "free film", that is one which has been removed from the substrate. (Briefly, the substrate has been pretreated with a lubricant that permits the cured film to be peeled from the substrate).

Also provided in accordance with the present invention is a method of adhesively bonding together two substrates to form a structurally reinforced composite. The method comprises the steps of (a) applying to the surface of one of the substrates a one package stable rubber based curable composition, comprising
  (i) a functional rubber polymer selected from the group consisting of functional homopolymers of polybutadiene, isoprene or neoprene; functional copolymers of polybutadiene, isoprene and/or neoprene; and functional copolymers of polybutadiene, neoprene or isoprene with an aliphatic or alicyclic unsaturated hydrocarbon; and
  (ii) a vulcanization system comprising sulfur, wherein the composition contains at least 15 parts of functional rubber polymer per 100 parts of composition and at least 15 parts of sulfur per 100 parts of the total of all rubber polymers in the composition, with the proviso that the cured composition has an elongation not exceeding 15 percent and the functional groups present on the functional rubber polymer of (i) remain essentially unreacted during cure of the composition;
(b) placing the surface of the second substrate in register with the first substrate surface coated with curable composition; and
(c) curing the composition thereby forming a structurally reinforced composite.

The method can be utilized with a variety of substrates but is particularly useful with aluminum; cold rolled steel; sheet molding compound (SMC); a variety of zinc coated metals, e.g., galvanized, galvaneel, electrogal, zincrometal; aluminum precoated metals; versions of the above metal substrates primed by electrodeposition, and plastics. One particular area of application is in preparing hem flange bonds for automobile structures such as doors.

Also provided in accordance with the present invention is a method of adhesively bonding together two substrates selected from the group consisting of aluminum, cold rolled steel, zinc coated metals, SMC and plastics which have been exemplified in more detail, above. The method comprises the steps of (a) applying to the surface of one of the substrates a one package stable rubber based curable composition, comprising:
  (i) a functional rubber polymer selected from the group consisting of functional homopolymers of polybutadiene, isoprene or neoprene; functional copolymers of polybutadiene, isoprene and/or neoprene; and functional copolymers of polybutadiene, neoprene or isoprene with an aliphatic or alicyclic unsaturated hydrocarbon; and
  (ii) a vulcanization system comprising sulfur, wherein the composition contains at least 15 parts of functional rubber polymer per 100 parts of composition and at least 15 parts of sulfur per 100 parts of the total of all rubber polymers in the composition, with the proviso that the functional groups present on the functional rubber polymer of (i) remain essentially unreacted during cure of the composition;
(b) placing the surface of the second substrate in register with the first substrate surface coated with curable composition; and
(c) curing the composition thereby forming a structurally reinforced composite.

The claimed rubber based curable compositions are particularly advantageous in that they do not have the dermatitis problems associated with epoxy compositions, offer excellent corrosion resistance, have wide spectrum adhesion and better impact resistance, better oily metal grab and T-Peel strength than currently used materials. Also the compositions are stable as one package for periods up to 3 months. As used herein, "stable" denotes that when the composition is kept at ambient temperature for a period of 3 months, less than 50 percent viscosity increase is observed with no detrimental effect on the physical properties of the composition.

The following examples are not intended to be limiting but rather are illustrative of the invention.

EXAMPLES

These examples illustrate the preparation and evaluation of some curable compositions according to the present invention.

Example 1 shows the effect of eliminating the functionality on performance. Examples 2-4 show the effect of varying the functionality from OH to $NH_2$ or $CO_2H$ groups, respectively. Examples 5-7 show the effect of the rubber copolymer composition on endproduct behavior, in these cases the functionality was identical to the previous respective examples yet stability of the mixture was compromised using the nitrile analogs which are not within the scope of the present invention. Example 8 demonstrates the use of sulfur in connection with calcium oxide as an activator.

| INGRE-DIENTS | COMPOSITIONS PARTS BY WEIGHT | | | | | | | |
|---|---|---|---|---|---|---|---|---|
| | 1 | 2 | 3 | 4 | 5 | 6 | 7 | 8 |
| POLYOIL 130 | 37 g | | | | | | | 37 g |
| R45HT | | 37 g | | | | | | |
| ATB | | | 37 g | | | | | |
| CTB | | | | 37 g | | | | |
| HTBN | | | | | 37 g | | | |
| ATBN | | | | | | 37 g | | |
| CTBN | | | | | | | 37 g | |
| Calcium Carbonate | 37 g | 37 g | 37 g | 37 g | 37 g | 37 g | 37 g | 37 g |
| MULTIFLEX SC | 37 g | 37 g | 37 g | 37 g | 37 g | 37 g | 37 g | 37 g |
| Sulfur | 12 g | 12 g | 12 g | 12 g | 12 g | 12 g | 12 g | 12 g |
| VULKACIT DM/C | 2 g | 2 g | 2 g | 2 g | 2 g | 2 g | 2 g | 2 g |
| Methyl ZIMATE | .8 g | .8 g | .8 g | .8 g | .8 g | .8 g | .8 g | 0 |
| Calcium Oxide | 6 g | 6 g | 6 g | 6 g | 6 g | 6 g | 6 g | 6 g |

POLYOIL 130: This resin is the polymeric product of 1,3-butadiene which is commercially available from HULS. The molecular weight is approximately 3000.
R45HT: This resin is commercially available from ATOCHEM and is the reaction product of 1,3-butadiene and hydrogen peroxide. The molecular weight is approximately 3000.
ATB: This is an amine-terminated 1,3-butadiene, adduct with a molecular weight of approximately 3000. Experimental samples were available from Sartomer Chemical Co.
CTB: 300 × 165 This is a carboxy-terminated 1,3-butadiene adduct with a molecular weight of approximately 3600. This product is commercially available from B. F. Goodrich.
HTBN: This is a hydroxy-terminated polybutadiene-acrylonitrile copolymer which is commercially available from B. F. Goodrich. The molecular weight is approximately 3600.
ATBN: 300 × 21 This amine-terminated butadiene-acrylonitrile copolymer is commercially available from B. F. Goodrich. The molecular weight is approximately 3600.
CTBN: 300 × 15 This is a carboxy-terminated polybutadiene-acrylonitrile copolymer which is commercially available from B. F. Goodrich. The molecular weight is 3600.
MULTIFLEX SC: This is a stearic acid treated carbonate filler which is commercially available from Pfizer.
Sulfur: The sulphur used was of the oil-treated insoluble variety available from Stauffer Chemical Co. under the brand name CRYSTEX.
VULKACIT DM/C: This is benzothiazyl disulfide which is commercially available from Mobay Chemical Co.
Methyl ZIMATE: This is zinc dimethyl dithiocarbamate which is commercially available from R. T. Vanderbilt Chemical Co.

LAP SHEAR STRENGTH:

Lap shear bonds for testing were prepared using two strips of metal 1 inch×4 inches×0.032 inches (2.54 cm×10.16 cm×0.178 cm) which were oil-treated hot-dipped galvanized, electrogalvanized and cold rolled steel. For each type of metal substrate, a 20 mil (0.051 cm) thick film of said composition was applied to one of the metal strips and then the second identical strip was placed overtop so that only 0.50 square inch strips overlapped. The bond was then cured at 350° F.(177° C.) for 30 minutes and subsequent lap shear strengths measured in pounds per square inch (PSI) were determined according to ASTM-D-1002-65. (The ends of the strips were separated at 0.5 inch per minute with an INSTRON tester. Presented data is an average of three separate determinations.)

STABILITY:

Compositions were formulated, allowed to stand one day and then initial viscosity was measured with a Brookfield Viscometer in centipoise (CPS) at 74° F.(23° C.). Samples were then placed in a 105° F.(40° C.) environmental chamber and measured at 2 day intervals via the above procedure. Greater than 7 days at elevated temperature is considered optimal.

Stability Data for compositions 1-8 detailed above is shown below.

ELONGATION:

The elongation in percent was determined with an INSTRON Tester according to ASTM D 638-72. The test was conducted at a speed of 5 inches per minute utilizing a sample measuring 1.5 inches×0.25 inch×0.080 inch (3.81 cm×0.64 cm×0.02 cm). The sample was taken from a "free film", that is, one which was removed from the substrate. The "free film" was obtained by applying the composition onto a substrate which had been pretreated with a lubricant that permitted the cured film to be peeled from the substrate.

| Composition | LAP SHEAR STRENGTH | | | Stability | Elongation (percent) |
|---|---|---|---|---|---|
| | Oil-Treated Cold Rolled Steel | Oil-Treated Hot-Dipped Galvanized | Oil-Treated Electro Galvanized | | |
| 1 | 200 PSI* | 250 PSI* | 120 PSI* | >7 days | 6.4 |
| 2 | 2400 PSI | 2100 PSI | 1990 PSI | >7 days | 12 |
| 3 | 2710 PSI | 2060 PSI | 1975 PSI | >7 days | not determined |
| 4 | 2200 PSI | 1980 PSI | 1950 PSI | ≈7 days | not determined |
| 5 | 3067 PSI | 2312 PSI | 2418 PSI | ≈15 minutes | not determined |
| 6 | GELLS BEFORE MIXING COMPLETED | | | | not determined |
| 7 | GELLS BEFORE MIXING COMPLETED | | | | not determined |
| 8 | 2200 PSI | 2000 PSI | 1850 PSI | >7 days | not determined |

*Denotes Adhesive Failure (Adhesive failure means that the adhesive pulled away from one metal surface completely. Cohesive failure means that the adhesive remained adhered to each metal surface but that the adhesive bonds were severed.)

The above data demonstrates that very diverse functional groups provide very good strength and wide spectrum adhesion; when other than the claimed functional rubber polymers are used (regardless of the functionality) the compositions are unstable (nitrile analogs of Examples 5-7); and although a specific functionality is not required, functional groups are necessary for uniform adhesion as evidenced by Example 1 which is a non-functional polybutadiene resin.

The great strength required for hem flange application coupled with wide spectrum adhesion (cohesive failure) is of paramount importance because completely severed bonds are still protected with material thereby preventing corrosion of the now exposed metal. Typically, adhesion to metal is obtained through the use of additional ingredients in the compounded rubber, e.g. phenolics, rosin acids, whereas the present invention does not require these other materials.

What is claimed is:

1. A one package stable rubber based curable composition, comprising:
   (a) a functional rubber polymer selected from the group consisting of functional homopolymer of butadiene, isoprene or neoprene; and functional copolymer of butadiene, isoprene and/or neoprene; and functional copolymer of butadiene, neoprene or isoprene with an aliphatic or alicyclic unsaturated hydrocarbon; and
   (b) a vulcanization system comprising sulfur, wherein the composition contains at least 15 parts of functional rubber polymer per 100 parts of composition and at least 15 parts of sulfur per 100 parts of total amount of all rubber polymers in the composition, with the proviso that the cured composition has an elongation not exceeding 15 percent; wherein said composition is substantially free of solid rubber and wherein said composition is substantially free of chemical groups which are reactive with the functional groups of said functional rubber polymer; said functional groups being selected from the class consisting of hydroxyl and anhydride.

2. The curable composition of claim 1 wherein the composition contains at least 20 parts of functional rubber polymer per 100 parts of composition.

3. The curable composition of claim 1 wherein the vulcanization system additionally comprises a zinc containing material different from the sulfur.

4. The curable composition of claim 1 wherein the functional rubber polymer is a hydroxyl functional homopolymer of butadiene.

5. The curable composition of claim 3 wherein the zinc containing material is zinc dimethyl dithiocarbamate.

6. The curable composition of claim 1 wherein the sulfur is used in conjunction with benzothiazyl disulfide.

7. The curable composition of claim 1 wherein the sulfur is elemental sulfur in the form of a solid oil-treated powder.

8. The curable composition of claim 7 wherein the curable composition contains at least 20 parts of sulfur per 100 parts of composition.

9. The curable composition of claim 1 wherein the functional rubber polymer has a number average molecular weight not exceeding 15,000.

10. The curable composition of claim 9 wherein the number average molecular weight of the functional rubber polymer does not exceed 8000.

11. The curable composition of claim 10 wherein the functional rubber polymer has a number average molecular weight ranging from about 1500 to about 5000.

12. The curable composition of claim 1 wherein the cured composition applied at a thickness of 20 mils has a lap shear strength of 1800 psi determined according to ASTM-D-1002-65 when baked at 350° F. for 30 minutes.

13. The curable composition of claim 1 in which the functional rubber is an anhydride functional rubber.

14. The curable composition of claim 13 in which the functional rubber is a copolymer of butadiene.

15. A one-package stable rubber-based curable composition comprising:
   (a) a functional rubber polymer selected from the group consisting of anhydride-functional copolymer of butadiene and hydroxyl-functional homopolymer of butadiene, and
   (b) a vulcanization system comprising sulfur wherein the composition contains at least 15 parts of functional rubber per 100 parts of the composition and at least 15 parts of sulfur per 100 parts of total amount of all rubber polymers in the composition, with the proviso that the cured composition has an elongation not exceeding 15 percent; wherein said composition is substantially free of solid rubber and wherein said composition is substantially free of chemical groups which are reactive with the functional groups of said functional rubber polymer.

* * * * *